United States Patent [19]
Paddison

[11] 3,790,779
[45] Feb. 5, 1974

[54] VEHICLE CONTROL APPARATUS

[75] Inventor: Denys Ian Paddison, Godalming, England

[73] Assignee: Secretary of State for the Environment in Her Britannic Majesty's Government of the United Kingdom of Great Britain and Northern Ireland, London, England

[22] Filed: Oct. 5, 1971

[21] Appl. No.: 186,754

[30] Foreign Application Priority Data
Oct. 6, 1970  Great Britain..................... 47433/70

[52] U.S. Cl........................... 246/182 C, 246/187 B
[51] Int. Cl............................................. B60l 15/40
[58] Field of Search.......... 246/182 B, 182 C, 187 B

[56] References Cited
UNITED STATES PATENTS

| | | | |
|---|---|---|---|
| 3,504,362 | 3/1970 | Feldmann......................... | 246/182 B |
| 3,562,515 | 2/1971 | Oster............................... | 246/182 B |
| 3,457,403 | 7/1969 | Smith, Jr.......................... | 246/182 C |

*Primary Examiner*—Gerald M. Forlenza
*Assistant Examiner*—George H. Libman
*Attorney, Agent, or Firm*—Moore & Hall

[57] ABSTRACT

Control apparatus for use in a vehicle, for controlling the vehicle throughout all stages of journeys in a versatile transport system wherein individual vehicles without drivers may be directed independently to different destinations over a network of predetermined paths or tracks. The apparatus includes a command signal receiver, means for deriving progress signals and a rate-of-progress signal, a first differencing circuit for deriving a position-lag signal dependent on the difference between a count of the command signals and a count of the progress signals, a computer circuit for deriving a headway-distance signal dependent on the rate-of-progress signal, a second differencing circuit for deriving a control signal dependent on the difference between the position-lag signal and the headway-distance signal, an integrating and limiting circuit for deriving a modified speed-demand signal dependent on the control signal, and a speed-control system for controlling the speed of the vehicle according to the value of the modified speed-demand signal. The command signals and the progress signals are pulses each representing increments of distance, whereas the position-lag signal, the headway-distance signal and the modified speed-demand signal are analogue voltage signals. The second differencing circuit and the integrating and limiting circuit may comprise means for developing a voltage $V_1$ when the headway-distance signal is less than the position-lag signal and a voltage $V_2$ when the headway-distance signal is greater than the position-lag signal, and a circuit for cumulatively integrating these voltages.

12 Claims, 4 Drawing Figures

VEHICLE CONTROL APPARATUS

BACKGROUND OF THE INVENTION

The present invention relates to vehicle control apparatus, and particularly to control apparatus intended to be mounted in each vehicle in a remotely controlled transport system. It is intended that embodiments of the invention will be used in a versatile transport system wherein individual vehicles may be directed independently to different destinations over a network of given paths or tracks.

In systems in which vehicles are moved independently over predetermined tracks, it is common practice to divide the tracks notionally into sections which may be marked or identified in various ways, and to determine or refer to the present locations of vehicles in the system by reference to the sections. For safety, signals are generally provided and may be controlled to ensure that no section of the track ever contains more than one vehicle. Position-indicating signals are sent from each vehicle to a remote controller, and movement command signals are sent from the controller to each vehicle. Such systems have the disadvantage that they depend on the communications to and from the controller, and on the reliability of the controller, to maintain a safe separation of the vehicles. A signalling error may result in accident or inconvenience.

In a system comprising driverless, automatically-controlled vehicles, it is particularly desirable that movement command signals should be made dependent on position-indicating signals so that the vehicles may be brought to rest in safety, entirely by the action of control apparatus within each vehicle, in the event of any complete or partial loss of communications with a remote control center. The control apparatus should also take account of limiting factors such as the maximum speed, the maximum acceleration and the maximum deceleration considered tolerable, possible or safe for the vehicle on a given track section.

To achieve a desirably high traffic flow rate, it is desirable that vehicles should be able to move in a regular stream over at least a major part of each journey. To facilitate this, various systems have been suggested in which vehicle control signals have been linked to and synchronized with a periodic master timing signal. Difficulties and complications arise, however, because many essential operations in the system are inherently asynchronous. For instance, loading and unloading operations will require vehicles to be taken out of, and fitted back into the traffic stream. It is difficult to make arrangements for the merging of traffic streams consistent with any plan for the completely synchronous operation of all traffic streams in a system. One suggested solution, which can be called the chess-playing or complete-schedule method, is to have a computer arranged to keep track of the positions of all vehicles in the system and to predict and tabulate their positions at a series of times sufficient to complete all their journeys; before any vehicle is allowed to join or rejoin any traffic stream, predictions of its proposed journey are compared with the tabulation, and it is not allowed to start until all these predictions fit into unoccupied spaces in the tabulation. This arrangement has the disadvantage that the amount of computing required increases approximately according to the square of the size of the system, and it is very inflexible. Congestion at a popular destination would for instance in this arrangement prevent persons setting out on their way to it, instead of allowing them the option of getting to the nearest uncrowded station, or approaching the destination by an alternative route. An even more important disadvantage of any system attempting to achieve completely synchronous, completely scheduled operation of all traffic streams is the disruption of the scheme which is liable to be caused by a fault in any vehicle or part of the control system. While vehicles and control systems can be made highly reliable, it will be uneconomic if not impossible to ensure absolute reliability, and in any system of practically useful size some possibility of breakdowns should therefore be accepted and allowed for. In a complex system with junctions and completely scheduled operation, any breakdown is liable to have extensive repercussions; places which should become vacant do not become vacant, and places are reserved for vehicles unable to come into them because of obstruction. The whole schedule has to be re-planned and places reallocated taking into account the effects of the fault. The amount of computation required for such reallocation rises as the square of the size of the system, and in a system of only moderate complexity it is likely to require the whole system to be brought to a standstill while a new schedule is worked out. The probability of such a standstill, with the accompanying waste and annoyance which it would cause, in effect places an economic or tolerance limit on the complexity of any system of completely synchronized traffic streams.

These disadvantages can be avoided by a control system which is convenient for both synchronous and asynchronous operations, does not attempt complete scheduling or prediction of the whole route of every journey, and accepts a possible need for asynchronous operations or queueing at any junction. This kind of system, hereinafter called a Cabtrack system, allows more freedom in route selection and modification; it can be arranged to direct vehicles around any obstruction or congested area.

It is an object of the present invention to provide satisfactory and advantageous control apparatus for installation and use in individually driven vehicles in such a system, for controlling their progress in traffic streams, queues, stations and junctions, over given paths or tracks.

SUMMARY OF THE INVENTION

According to the present invention, there is provided control apparatus, for controlling a vehicle in response to command signals in a transport system wherein the vehicle will travel over given paths or tracks, which includes:

means for deriving progress signals which at least in the normal operation of the system will substantially represent the actual progress of the vehicle;

means for providing a rate-of-progress signal which at least in the normal operation of the system will substantially represent the actual rate-of-progress of the vehicle;

a first comparison circuit, having a first input for receiving command signals and a second input connected to receive said progress signals, for deriving a position-lag signal dependent on differences between the command signals and the progress signals;

a headway-distance computer, for deriving a headway-distance signal representing a desirable headway distance dependent on the speed represented by the said rate-of-progress signals;

and a differencing, integrating and limiting circuit, having a first input connected to receive the said position-lag signal and a second input connected to receive the said headway-distance signal, for deriving a modified speed-demand signal dependent on a cumulative integration of the differences between the position-lag signal and the headway-distance signal, and limiting the range of values and the maximum rate of change of the said modified speed-demand signal.

The control apparatus may also include a command signal receiver for receiving command signals from a remote controller and applying them to the said first comparison circuit, and a speed-control servo-system for controlling the vehicle in response to the said modified speed-demand signal. The servo-system should preferably include a progress feedback loop and a rate-of-progress feedback loop, in order to make the actual rate-of-progress follow the modified speed-demand signal with negligible error in all normal operations of the system. The headway-distance computer may then be connected to use the modified speed-demand signal as an actual rate-of-progress or velocity signal, and to calculate the headway-distance signal from the modified speed-demand signal. A variable-rate pulse-generator circuit may be connected to produce pulses at a rate dependent on the instantaneous value of the modified speed-demand signal, so that each pulse substantially represents an increment of actual progress. The first comparison circuit may then comprise a reversible counter circuit, having one input connected to receive pulses from the said variable-rate pulse-generator circuit and another input connected to receive command signals in the form of pulses, for providing an output dependent on the difference between the cumulative total number of pulses received from the pulse-generator and the cumulative total number of command signal pulses received.

Clearly, the signals in or applied to the control apparatus may be digital signals or analogue signals. Alternatively digital signals may be used in some parts and analogue signals in other parts of the system; clearly some connections may then have to be made through digital-to-analogue converters or analogue-to-digital converters.

The differencing, integrating and limiting circuit may include a comparison and threshold circuit for developing a first predetermined voltage when the headway-distance signal is greater than the position-lag represented by the position-lag signal and developing a second predetermined voltage when the said headway-distance is less than the said position-lag; a cumulative integrating circuit for deriving a speed-demand signal dependent on a cumulative integration of the voltages developed by the comparison and threshold circuit; and means for limiting the speed-demand signal to a predetermined range of values. In this arrangement, the predetermined voltages will effectively limit the maximum rate of change of the speed-demand signal. The headway-distance signal and the position-lag signal may be made available as analogue-voltage signals, and the comparison and threshold circuit may comprise a differential direct-current amplifier and a threshold circuit connected to the amplifier output.

The speed-control servo-system may include a wheel speed transducer for providing a signal dependent on the rate of rotation of a wheel of the vehicle, a track marker detector for providing a pulse whenever the vehicle passes a marker device in the path on which it travels, and first combining means for combining the outputs of the wheel speed transducer and the track marker detector and thereby producing a signal dependent on the actual speed of the vehicle. The speed-control servo-system may also include a second comparison circuit, for comparing signals derived from the modified speed-demand signal and the track marker detector, and deriving a signal dependent on the difference between the said derived signals; a second combining means for combining the actual-speed signal from the first combining means with the modified speed-demand signal to form a signal dependent on the difference between them; and a third combining means for additively combining the outputs of the second comparison circuit and the second combining means to form a signal for controlling a motor to drive the vehicle.

The second comparison circuit may include a reversible counter having one input connected to receive pulses from the track marker detector and another input connected to receive pulses from the aforesaid variable-rate pulse generator, for providing a signal dependent on the difference between the number of pulses received from the track marker detector and the number of pulses received from the variable-rate pulse generator.

BRIEF DESCRIPTION OF THE DRAWINGS

Embodiments of the invention will now be more fully described, by way of example only, with reference to the accompanying drawings, of which.

DESCRIPTION OF THE PREFERRED EMBODIMENTS

Figure 1:
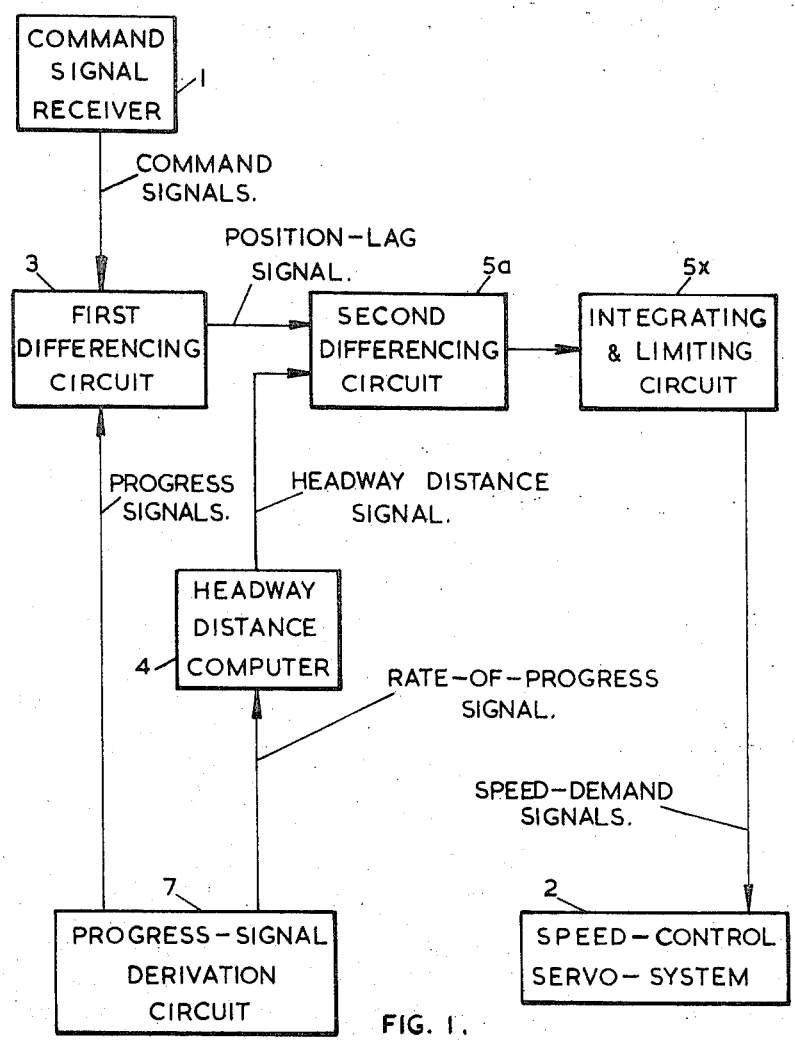
FIG. 1 is a schematic block circuit diagram showing the basic arrangment of circuits involved in a vehicle control apparatus.

FIG. 1 shows control apparatus for installation in a vehicle, including a command signal receiver 1, which may be of any known kind suitable for receiving command signals from a remote controller and effective in a vehicle in motion over predetermined tracks. The command signal receiver 1 is connected to a speed-control servo-system 2 by a control-modifying arrangement which comprises a first differencing circuit 3, a headway-distance computer 4, a second differencing circuit 5a, an integrating and range-limiting circuit 5x and a progress signal derivation circuit 7. In normal operation, the receiver 1 will apply command signals to one input of the comparison circuit 3, and modified speed-demand signals will be developed on the output of the circuit 5x and applied to the speed-control servo-system 2. The progress-signal derivation circuit 7 is connected to apply progress signals, substantially representing the actual progress of the vehicle, to the second input of the first differencing circuit 3, and to apply a rate-of-progress signal, substantially representing the actual speed of the vehicle, to the headway distance computer 4. The first differencing circuit 3 is constructed to produce signals dependent on a difference between the signals applied to its inputs; various known circuits may be used to achieve this effect.

The command signals applied to the comparison circuit 3 represent a desired forward motion, ordered by a remote controller. The circuit 3 compares these command signals with the progress signals, and provides an output which represents a position lag, resulting from the cumulative effect of the differences between the desired progress represented by the command signals and the actual progress made in response to the modified speed-demand signals.

The computer circuit 4 responds to the rate-of-progress signal and derives a corresponding headway distance signal. The desired headway distance for any given speed is the distance ahead of the vehicle which should preferably be kept clear of any obstructions in order to ensure that the vehicle can be brought safely to rest if necessary. Since the kinetic energy to be dissipated in bringing the vehicle to rest is proportional to the square of its speed, and if a given maximum deceleration is maintained the required braking distance will be proportional to the square of the initial velocity, the desired headway distance will be substantially proportional to the square of the corresponding value of the modified speed-demand signal. The computer circuit 4 may therefore be an analogue-voltage squaring circuit or a digital number squaring circuit of known form. However, its output need not be exactly proportional to the square of the modified speed-demand signal value — departures from an exact square-law relationship may be made for convenience, or extra safety, or to allow for the response time of the control system for instance.

The second differencing circuit 5a responds to the difference between the position-lag signal and the headway-distance signal, so that it will only increase its speed-demand signal output when the position-lag exceeds and increases relative to the headway distance which has been selected as satisfactory for the actual speed represented by the rate-of-progress signal. When the vehicle reaches a commanded velocity, the position-lag will be substantially equal to the corresponding desired headway distance. In effect, the circuit 5 modifies the speed-demand signals so that they lag behind the command signals sufficiently to ensure that a count, or integration, of the command signals will indicate a position, ahead of the vehicle's actual position, in which the vehicle can safely come to rest, and in which it will actually come to rest if its command signals are terminated by any fault. In the operation and control of the system, at any given time each vehicle is associated with a track section or slot allocated to it, and only one vehicle is allowed to be allocated to any given slot at a given time, as in previously known systems; however in the present system each vehicle is associated with a slot in which it can come to rest, as distinct from the slot in which it is presently situated.

This arrangement simplifies the control facilities required in a Cabtrack system, and facilitates the achievement of fail-safe controlled operation. In particular, considerable simplifications result from the fact that this arrangement can allow the application of emergency braking as well as normal acceleration or deceleration, without disturbing the relationship of the vehicle to the slot with which it is associated. Thus any number of normal accelerations and decelerations can be applied to a vehicle in the course of a journey without requiring any corrections to the record of the slot with which the vehicle is associated, and even if an emergency braking has been necessary, such a correction should usually not be required.

The command signals are preferably in the form of pulses, each representing a desired increment of forward motion, for instance an instruction to move on from one predetermined section of the track to the next. It follows that a command for the vehicle to move forward at a required speed may be transmitted as a regular stream of pulses having a pulse rate corresponding to the required speed. A command for the vehicle to move forward a required number of slot lengths may be transmitted as a sequence of pulses, the number of pulses in the sequence being proportional or equal to the number of slot lengths of movement required. This is a convenient form of control.

Clearly, progress signals and rate-of-progress signals which always represent the actual progress or actual rate of progress of the vehicle can be provided by conventional transducers and circuits known in the art, for instance as described in U.S. Pat. No. 3,562,515 (Oster) and 3,334,224 (Allen et al.). Thus actual progress signals may be derived by a track marker detector such as the unit 20 of FIG. 2 described hereinafter, and actual rate-of-progress signals may be derived either by a wheel speed transducer (21) or by integrating actual progress increment signals from a track marker detector (20) as hereinafter described with reference to FIG. 2. However, if the progress signal and the rate-of-progress signal are derived in any such way, the whole arrangement of FIG. 1 will form a single servo-system, for the unit 2 will control the progress of the vehicle, and this will in turn determine the progress signals. It is thought that in any such system it might be difficult to avoid excessive phase lags which would tend to cause instability in the servo-system, due to the large number of stages in the loop — such difficulties are of course very well known to the designers of servo-systems.

To minimize or avoid such difficulties, the preferred form of the invention uses an arrangement which is effectively two servo-systems, wherein a first servo-system sets the speed-demand signals, and the second servo-system makes the actual speed of the vehicle follow the speed-demand signals very closely. The second, or speed-control servo-system which will form the unit 2 of FIG. 1 includes a progress feedback loop and a velocity or rate-of-progress feedback loop and is made effective to ensure that in normal operations of the system the actual speed of the vehicle will follow the speed represented by the modified speed-demand signal closely, so that the errors involved in calculating headway-distance from the modified speed-demand signal instead of from an actual-speed signal may be neglected. The progress-signal derivation circuit 7 may then simply comprise a connection for applying the modified speed-demand signal to the headway-distance computer 4 and a pulse-generator circuit connected to generate pulses at a variable repetition rate proportional to the speed represented by the modified speed-demand signal. Since in normal operations the modified speed-demand signal will be substantially equivalent to an actual-speed signal, and the pulse rate is proportional to it, each pulse can be taken as representing an increment of progress demanded by the modified speed-demand signal.

It should be noted, however, that in this preferred arrangement the modified speed-demand signal is generated by means independent of the actual rate-of-progress of the vehicle. While the actual rate-of-progress of the vehicle is normally made to follow the modified speed-demand signal very closely by the speed-control-servo-system, it is conceivable that the modified speed-demand signal and the signals derived from it could continue to indicate demanded progress even if a major fault, obstruction or accident prevented the speed-control servo-system from maintaining the speed demanded. Such occasions would be considered abnormal; clearly a practical transport system using remotely-controlled driverless vehicles ought to incorporate some arrangements for detecting any such occurrences and taking appropriate emergency action. Such arrangements would be additional to, and do not form any part of the present invention.

The communications and control equipment in the system are greatly simplified because the velocity and acceleration limiting, and actions to compensate for the weight of load in the vehicle, the gradients of the track, and force of wind on the vehicle, are achieved by the control apparatus in each vehicle, and in general it is not necessary for trackside or central control apparatus to be given or to take account of such factors.

One possible form of the control apparatus and its operation in a vehicle in a transport system will now be described in greater detail with reference to FIG. 2. Here the command signal receiver 1 and the computer circuit 4 are shown as before. The units 3a, 3b, 3c, 4, 5a, 5b, 5c and 10 form the first servo-system, for setting the speed demand signal. The comparison circuit (3 in FIG. 1) is provided in the form of a reversible counter circuit 3b to which a digital-to-analogue conversion circuit 3c is attached. The second differencing circuit 5a is a differential amplifier. The integrating and limiting circuit (5x in FIG. 1) comprises a threshold circuit 5b and an integrating amplifier 5c which is connected to two reference voltage sources, $V_{max}$ and $V_{min}$, by two diodes 5d and 5e respectively. The threshold circuit 5b may be a conventional circuit of the Schmitt trigger type, connected to the differential amplifier 5a so as to develop a first predetermined output voltage $V_1$ whenever the position-lag signal from 3c is greater than the headway-distance signal from the computer circuit 4, and to develop a second predetermined voltage $V_2$ whenever the position-lag signal is less than the headway-distance signal. The integrating amplifier 5c is an operational amplifier with capacitive feedback, arranged to produce a signal representing a cumulative integration of the signals applied to its input. The diodes 5d and 5e are connected either to the output or to feedback connections of the amplifier 5c, so as to confine its output voltage to the range from a voltage $V_{min}$ (which represents zero speed, i.e., a demand to remain stationary) to a voltage $V_{max}$ (which represents a chosen maximum speed). The output of the amplifier 5c provides an analogue form of the modified speed-demand signal; it is connected to control a variable-rate pulse generator circuit 10, which produces a stream of pulses of repetition rate determined by the value of the modified speed-demand signal. The output of the variable-rate pulse-generator circuit 10 is connected by a pulse-rate divider circuit 3a to the second input of the reversible counter circuit 3b.

Figure 2:
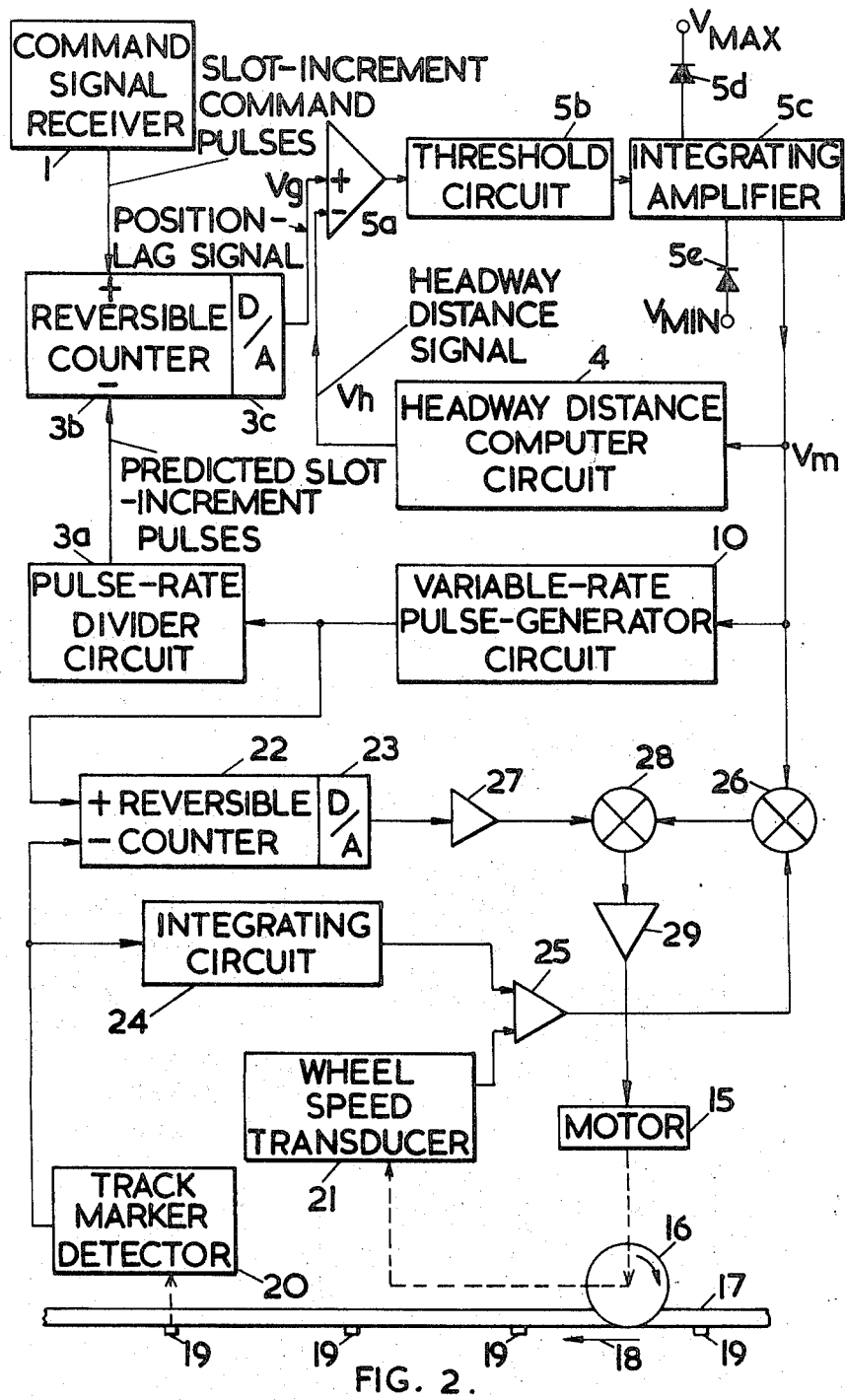
FIG. 2 is a schematic block circuit diagram showing one form of the vehicle control apparatus in greater detail.

In the embodiment of FIG. 2, the speed-control servo-system (2 in FIG. 1) comprises items 20 to 29 inclusive which will be more fully described hereinafter. It controls a motor 15 which is connected to drive the vehicle wheels, as indicated diagrammatically at 16, so as to move the vehicle along a prepared track 17. The arrow 18 represents the relative motion of the track 17 with respect to the apparatus in the vehicle, as the vehicle moves over the track 17. Track marker devices 19 are located at approximately equal intervals along the track 17.

The speed-control system includes a track-marker detector 20, constructed to sense the proximity of the track marker devices 19 and to provide a pulse output whenever it passes over one of the track marker devices 19. There is also a wheel-speed transducer 21 physically coupled to the wheel 16 so as to produce an analogue voltage output dependent on the rate of rotation of the wheel 16. A comparison circuit in the form of a reversible counter 22 has a positive-incrementing input connected to receive the pulses produced by the variable-rate pulse-generator circuit 10. It also has a negative-incrementing input connected to the output of the track marker detector 20, and has a digital-to-analogue conversion circuit 23 attached to it so as to provide an analogue signal output representing the difference between the cumulative total number of pulses received from the variable-rate pulse-generator 10 and the cumulative total number of pulses received from the track marker detector 20.

The output of the track marker detector 20 is also applied to an integrating circuit 24 to form an analogue signal dependent on the speed of the vehicle as measured by the rate of occurrence of the output pulses of the track marker detector 20. The outputs of the integrating circuit 24 and the wheel speed transducer 21 are applied to and combined in an amplifier 25. The outputs of the amplifiers 5c, and 25 are applied to a first combining circuit 26. The output from the conversion circuit 23 is connected through an amplifier 27 to a second combining circuit 28 which is also connected to receive the output from the first combining circuit 26. The output of the second combining circuit 28 is connected by a power amplifier 29 to the motor 15.

In the operation of the system comprising a plurality of vehicles each fitted with control apparatus of the form shown in FIG. 2 and constrained to travel over predetermined tracks, in a typical vehicle the command signal receiver will receive pulse signals from a remote controller. In a preferred form of the system the predetermined tracks are notionally divided into sections, hereinafter called slots. The slots may be marked by slot marker devices installed in the tracks, which are detected by the track marker detector 20. There are an integral number of the track marker devices 19 installed in each slot length of the track.

The variable rate pulse-generator circuit 10 is a conventional controllable multivibrator circuit constructed to produce pulses in response to a speed-demand signal voltage $V_m$ at a recurrence rate substantially equal to the rate at which the vehicle will pass the track marker devices 19 when it is travelling at the speed represented by the voltage $V_m$. Hence, when the vehicle is actually travelling at the speed represented by the speed demand signal, the pulse generator 10 and the track marker detector 20 will apply substantially equal numbers of pulses to the two inputs of the reversible counter 22. The pulse-rate divider circuit 3a is a conventional ring counter having a division ratio equal to the number of track markers 19 provided in each slot length of the track. The output of the circuit 3a therefore forms a series of pulses corresponding to the number of slot lengths passed when the vehicle progresses at the speed represented by the speed-demand signal voltage. The speed-control servo-system, comprising parts 20 to 29 inclusive, will tend to match the actual speed of the vehicle to the speed represented by the speed-demand signal, but as in all servo-systems under dynamic conditions, there will generally be some transient differences and variations between the actual speed and the speed demanded. It is therefore appropriate to refer to the output of the pulse-rate divider circuit 3a as the predicted slot-increment pulses; they will correspond approximately to slot-length increments of demanded progress.

The pulses applied to the positive-incrementing input of the reversible counter 3b therefore represent slot-length increments of progress, commanded by a system controller whereas the pulses applied to the negative-incrementing input of the counter 3b approximately represent slot-length increments of progress actually demanded by the modified demand signal of the vehicle's control apparatus. Hence the content of the counter 3b will represent a position lag which is the result of the cumulative effects of the modifying actions of the parts 4 and 5a to 5e. The digital-analogue conversion circuits 3c provide an analogue-voltage signal representing this position lag.

Figure 4:
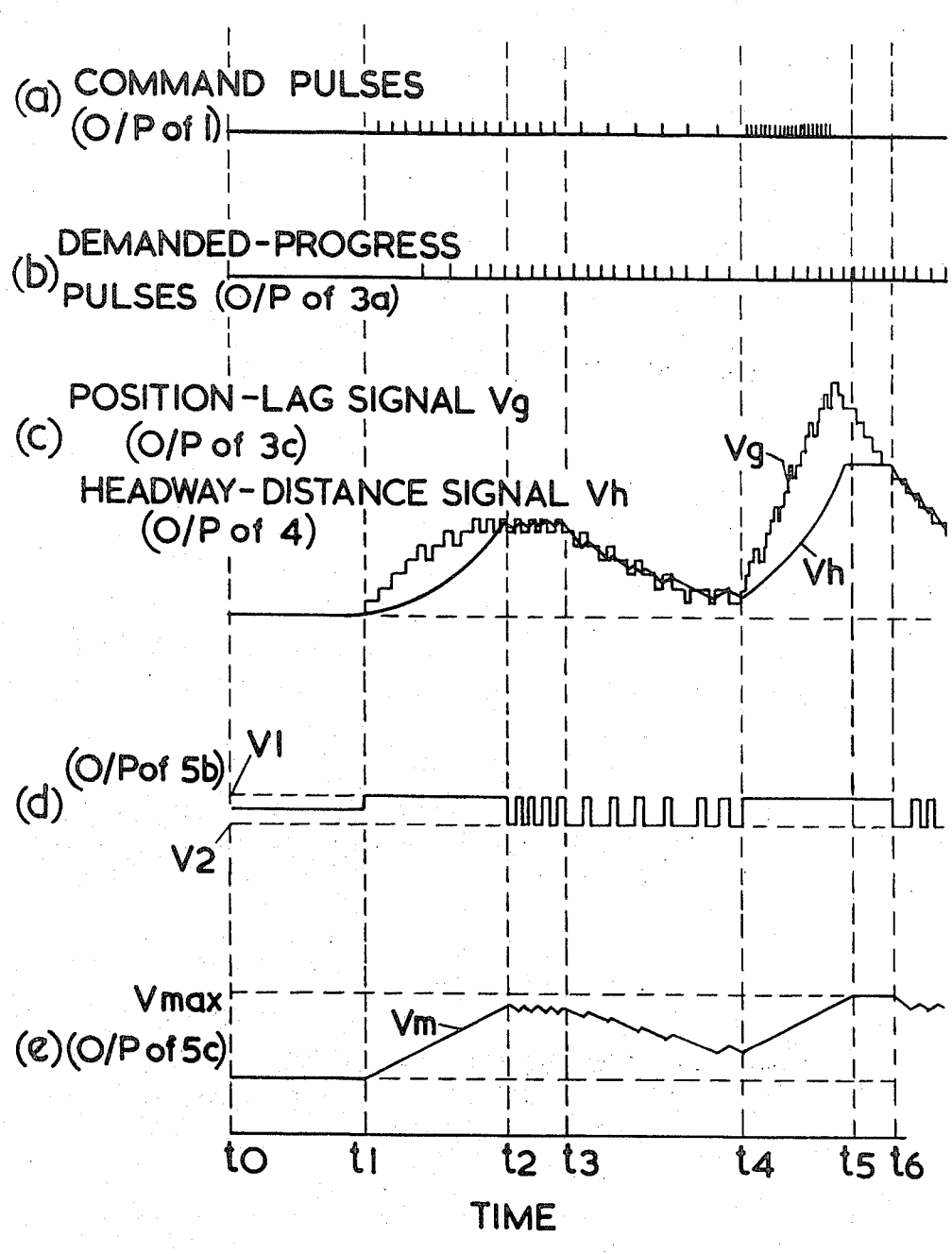
FIG. 4 is a graphical illustration of signals involved in typical operations of the apparatus of FIG. 2.

The operation of these units is illustrated by FIG. 4, which shows signals involved in typical operations of the apparatus of FIG. 2, drawn against a common horizontal time-scale so that their relationships can be readily appreciated. In this FIG. 4, command pulses (output signals from the receiver) as shown at (a); demanded-progress pulses (output signals from the divider 3a) are shown at (b); the resulting position lag signal $V_g$ and the headway-distance signal $V_h$ derived by the units 3c and 4 respectively are shown at (c); the output of the threshhold circuit 5b is shown at (d); and the resulting modified speed-demand signal $V_m$ is shown at (e).

When the vehicle is initially at rest, the position-lag signal output of the circuit 3c, the headway-distance signal and the output of the threshold circuit 5b will represent zero values as indicated at the time $t_0$ in FIG. 4. At the time $t_1$, suppose that the receiver 1 starts to receive a train of command pulses at a regular repetition rate of Nc pulses per second, representing a command to accelerate to a speed of Nc slot-lengths per second and maintain that speed as long as the pulses are received at that repetition rate. The command pulses coming into the counter 3b will increase its output, making the position lag signal $V_g$ greater than the headway distance signal $V_h$. Whenever the position lag signal exceeds the headway distance signal, the threshold circuit 5b applies a voltage $V_1$ to the integrating amplifier 5c, which will be integrated to form a linearly increasing speed-demand signal $V_m$. The voltage $V_1$ is chosen to make the rate of increase of $V_m$ in these circumstances correspond to the maximum acceleration considered acceptable for reasons of passenger comfort. As $V_m$ rises linearly, the headway distance signal $V_h$ rises in proportion to the square of $V_m$, and the pulse generator 10 generates pulses at a rate which increases linearly. As $V_m$ rises to a value corresponding to the commanded speed of Nc slot-lengths per second, the output pulse-rate of the divider circuit 3a approaches the command pulse rate and therefore the position-lag signal approaches a steady value approaching the time $t_1$. The headway-distance signal becomes equal to the position-lag signal at the time $t_2$ when the modified speed-demand signal $V_m$ reaches a voltage corresponding to the commanded speed Nc. The position-lag signal $V_g$ will then vary by increments corresponding to variations of +1 and −1 count, alternately as the counter receives pulses from the divider circuit 3a and the receiver 1. The output of the threshold circuit 5b will then switch from voltage $V_1$ to voltage $V_2$ alternately and this action will tend towards a 1/1 mark/space ratio, constraining $V_m$ to remain at the level which corresponds to between the times $t_2$ and $t_3$ the commanded speed Nc.

If the rate of the command pulses is now significantly reduced, the position-lag signal $V_g$ will fall and the threshold circuit 5b will apply the voltage $V_2$ to the integrating amplifier 5c. The integration of this signal causes the output $V_m$ to fall at a rate which is linear with a slope corresonding to the maximum acceptable deceleration $V_h$ therefore also falls, decreasing as the square of $V_m$. As $V_h$ and $V_g$ both decrease, $V_h$ may become temporarily less than $V_g$ causing the output of the threshold circuit to switch temporarily to $Vl$ again, but this will very quickly restore the condition $V_h$ greater than $V_g$, so this only causes slight intermittent irregularities in the decreasing signal $V_m$ between times $t_3$ and $t_4$.

The foregoing description assumes that the commanded speed of Nc slot-lengths per second is not greater than the maximum acceptable speed and the speed-demand signal $V_m$ therefore less than the maximum allowable value $V_{max}$. In the operation of the system it may also be convenient to transmit a command for a chosen vehicle to move forward a given number of slot lengths by a sequence of pulses in rapid succession. The action in such cases is illustrated between times $t_4$ and $t_6$ in FIG. 4. The rapid sequence of pulses will raise the count in the counter 3b and the position-lag signal $V_g$ temporarily to a high value, which will then gradually be reduced as the vehicle proceeds to the required position. At first, it will proceed with maximum acceleration, but the acceleration must be stopped if and when the vehicle reaches the maximum safe speed. This is achieved as shown at time $t_5$ in FIG. 4 by the limiting action of the diode 5d which prevents $V_m$ exceeding $V_{max}$. Thus $V_m$ is held at $V_{max}$ and the vehicle proceeds at maximum speed until the time $t_6$ when it comes to within the headway distance of the commanded destination. If no further command pulses have been received, the position lag signal will then become less than the headway distance signal, and the vehicle will be decelerated to come to rest at the destination.

The operation of the speed-control servo-system, which responds to the speed-demand signal $V_m$ and controls the motor 15 accordingly, will now be described in more detail. The wheel-speed transducer 21 provides an actual-speed signal with a rapid response to changes in the vehicle speed, for instance changes due to gusts of wind or sudden changes in the gradient of the track. However, pneumatic tires are desirable to provide a quiet, smooth ride and good adhesion to the track, and where pneumatic tires are used, tire wear and varying tire inflation pressures reduce the accuracy of speed-signals from a wheel-speed transducer. The track marker detector 20 provides an output which, after smoothing or integration in the circuit 24, will form a more accurate speed signal, but the high-frequency response of this signal will be limited by the spacing of the track markers 19 and it is uneconomic to have the track markers 19 closely spaced. The outputs of the circuits 21 and 24 are combined in the amplifier 25 to produce a speed signal having a satisfactory high-frequency response and comparatively high accuracy at medium frequencies. This signal is compared in the combining device 26 with the modified speed-demand signal to produce a speed-error signal. The combining device 26 may, for instance, be a differential amplifier.

As hereinbefore indicated, the positive-incrementing input of the reversible counter 22 receives pulses representing position-increments corresponding to the current value of the modified speed-demand signal, while its negative-incrementing input receives pulses representing track markers actually passed. The content of the counter 22 therefore represents the cumulative result of speed errors, and the corresponding analogue output from the circuit 23 is taken as a second speed-error signal having a lower-frequency response and greater long-term accuracy. The speed-error signals are combined in the device 28, which may be a conventional summing amplifier, and are applied through the power amplifier 29 to control the acceleration of the motor 15.

It should be realized that various modifications or alternative arrangements of the described embodiment may be useful. For greater accuracy the Schmitt trigger may be connected to control electronic switch circuits (not shown) to connect the input of the integrating amplifier to sources of reference voltages $V_1$ and $V_2$.

Figure 3:
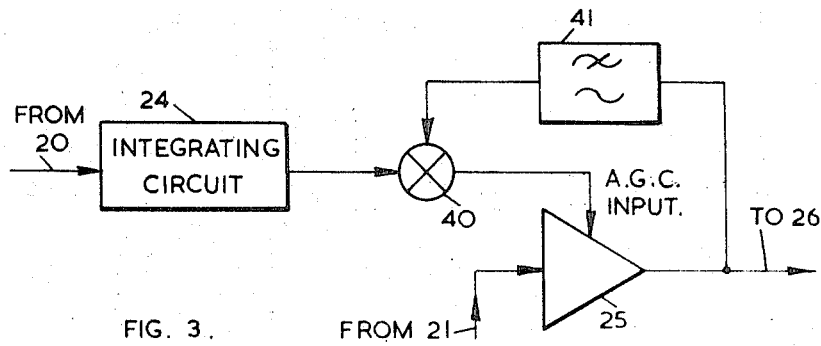
FIG. 3 is a schematic block circuit diagram showing an alternative form for a part of the apparatus of FIG. 2(;)

The wheel-speed signal can be made more accurate by applying the output of the integrating circuit 24 to an automatic-gain-control circuit controlling the gain of the amplifier 25, so that it tends to compensate for tire wear and inflation effects by varying the gain of the amplifier 25. FIG. 3 shows an arrangement of this kind, wherein the output of the integrating circuit 24 is connected to a combining device 40 whose output controls an automatic-gain-control input of the amplifier 25. A feedback line from the output of the amplifier 25 is connected through a low-pass filter 41 to the combining device 40. In operation, the output of the device 40 depends on the difference between the signals from the integrating circuit 24 and the filter circuit 41, and it adjusts the gain of the amplifier 25 so that an average level of its output substantially matches the output derived from the track marker detector signals by the integrating circuit 24, thereby increasing the accuracy of the actual speed signal output without impairing its high speed response. The integrating circuit 24 may be a simple resistance-capacitance circuit or low-pass filter circuit of a conventional kind; alternatively it may comprise a circuit of the kind known as a diode pump circuit, which passes a given amount of charge to a low-pass filter for each pulse which it receives.

The spacing of the track marker devices may be reduced on sections of the track where lower speeds are desirable, and increased on long straight sections comparatively free from hazards.

It may be possible to use a single circuit which performs the functions of the two circuits 5a and 5b.

I claim:

1. Control apparatus for use in a vehicle, for controlling the vehicle in a transport system wherein the vehicle will travel over given paths or tracks, comprising:

means for receiving command signals representing desired progress of the vehicle, a first servo-control means, having an input connected to the receiving means, for deriving modified speed-demand signals which depend on the said command signals but also take account of prescribed headway-distance, maximum acceleration and maximum deceleration limitations, and a second servo-control means, connected to the first servo-control means and responsive to the modified speed demand signals, for controlling the speed of the vehicle;

the said first servo-control means comprising:

progress-signal deriving means for deriving demanded-progress signals substantially representing the progress demanded by said modified speed-demand signals, first differencing means, having a first input connected to the command signal receiving means and a second input connected to the progress signal deriving means, for deriving a position-lag signal dependent on the difference between the desired progress represented by the command signals and the demanded progress represented by the demanded progress signals, headway distance computer means, connected to receive the said modified speed-demand signals for deriving a headway-distance signal representing a desirable headway distance corresponding to the speed represented by the said modified speed-demand signals, second differencing means, having a first input connected to receive the said position-lag signal and a second input connected to receive the said headway-distance signal, for deriving a control signal dependent on the difference between the distance represented by the position-lag signal and the distance represented by the headway-distance signal, and integrating and limiting means, connected to receive the said control signal from the said second differencing means, for deriving the said modified speed-demand signal from the said control signal and for limiting the range of values of the said modified speed-demand signal in accordance with the said maximum acceleration and maximum deceleration limitations.

2. Apparatus as claimed in claim 1 wherein the said second servo-control means comprises a progress feedback means and a rate-of-progress feedback means, for making the actual rate-of-progress of the vehicle follow the said modified speed-demand signal with negligible error.

3. Apparatus as claimed in claim 2 wherein the said modified speed-demand signal is made available as an analogue voltage signal, and the said progress-signal deriving means comprises a voltage-to-frequency converting means having an input connected to receive the said modified speed-demand signal and an output connected to the said second input of the said first differencing means.

4. Apparatus as claimed in claim 1 wherein the said command signals are made available as a sequence of pulses wherein each pulse represents an increment of desired progress, the said demanded-progress signals being made available as a sequence of pulses wherein each pulse represents an increment of progress demanded by the said modified speed-demand signals, and the said first differencing means comprises a reversible counter circuit means, for providing a position-lag signal dependent on the difference between the cumulative total number of command signal pulses received and the cumulative total number of progress signal pulses received.

5. Apparatus as claimed in claim 1 wherein the said position-lag signal and the said headway-distance signal are made available as analogue voltage signals, and the said second differencing means comprises a differential direct-current amplifier having a first input connected to receive the said position-lag signal and a second input connected to receive the said headway-distance signal.

6. Apparatus as claimed in claim 1 wherein the said integrating and limiting means comprises: threshold circuit means for developing a first predetermined voltage output whenever the headway-distance represented by the headway-distance signal is less than the position-lag represented by the position-lag signal, and for developing a second predetermined voltage output whenever the headway-distance represented by the headway-distance signal is greater than the position-lag represented by the position-lag signal; cumulative integrating means, for developing a speed-demand signal dependent on a cumulative integration of the voltages developed on the output of the threshold circuit means; and limiting means, for limiting the speed-demand signal to a predetermined range of values.

7. Apparatus as claimed in claim 1, for use in a vehicle having at least one wheel continuously in rolling engagement with the track or path on which the vehicle runs, wherein the said second servo control means comprises wheel speed transducer means for providing a signal dependent on the rate of rotation of the said wheel, track marker detector means for providing a pulse whenever the vehicle passes a marker device in the path on which it travels, and first combining means connected to the said wheel speed transducer means and the said track marker detector means for combining their outputs to form an actual speed signal, dependent on the output of the wheel speed transducer means and also dependent on the pulse rate of the output of the track marker detector means.

8. Apparatus as claimed in claim 7 wherein the said first combining means comprises an integrating circuit connected to receive the pulses from the track marker detector means, an amplifier having a signal input connected to receive the output of the wheel speed transducer means and also having a gain control input and an output, a low-pass filter connected to the output of the amplifier, and means connected to the integrating circuit, the low-pass filter and the gain-control input, for controlling the gain of the amplifier so as to reduce the difference between the output of the low-pass filter and the output of the integrating circuit.

9. Apparatus as claimed in claim 7 comprising means for deriving progress signals from the said modified speed-demand signal, and wherein the said speed control means comprises: a third differencing means for deriving a signal dependent on the difference between the progress represented by the said progress signals and the progress represented by the output pulses of the track marker detector; a second combining means for combining the actual speed signal from the first combining means with the modified speed-demand signal to form a signal dependent on the difference between the speeds which they represent; and a third combining means for additively combining the outputs of the said third differencing means and the said second combining means to form a signal for controlling the speed of the vehicle.

10. Apparatus as claimed in claim 9 wherein the progress signals are made available in the form of pulses each representing an increment of progress, and the said third differencing means comprises a reversible counter circuit means, for providing a signal dependent on the difference between the total number of progress signal pulses and the total number of the track marker detector pulses applied to it.

11. Control apparatus for use in a vehicle, for controlling the vehicle in response to command signals in a transport system wherein the vehicle will travel over given paths or tracks, comprising servo-control means for deriving modified speed-demand signals dependent on said command signals but also taking account of prescribed headway-distance, maximum-acceleration and maximum-deceleration limitations, the said servo-control means comprising:

progress-signal deriving means for deriving demanded-progress signals substantially representing the progress demanded by said modified speed-demand signals, first differencing means, having a first input for receiving said command signals and a second input connected to the progress signal deriving means, for deriving a position-lag signal dependent on the difference between the desired progress represented by the command signals and the progress represented by the demanded-progress signals, headway distance computer means, connected to receive the said modified speed-demand signals, for deriving a headway-distance signal representing a desirable headway distance corresponding to the speed represented by the said modified speed-demand signal, second differencing means, having a first input connected to receive the said position-lag signal and a second input connected to receive the said headway-distance signal, for deriving a control signal dependent on the difference between the distance represented by the position-lag signal and the distance represented by the headway-distance signal, and integrating and limiting means, connected to receive the said control signal from the said second differencing means, for deriving the said modified speed-demand signal from the said control signal and for limiting the range of values of the said modified speed-demand signal in accordance with the said maximum acceleration and maximum deceleration limitations.

12. Control apparatus for use in a vehicle for controlling the vehicle in a transport system wherein the vehicle will travel over given paths or tracks, comprising:

means for receiving command pulses representing desired increments of progress of the vehicle;

a first servo-control means, having an input connected to the receiving means, for deriving modified speed-demand signals which depend on the said command signals, but also take account of prescribed headway-distance, maximum acceleration and maximum deceleration limitations;

second servo-control means connected to the first servo-control means and responsive to the modified speed-demand signals, for controlling the speed of the vehicle;

the said first servo-control means comprising:

progress-signal deriving means for deriving progress-signal pulses substantially representing the progress demanded by said modified speed-demand signals;

reversible counter means having a first input connected to receive the said command pulses and a second input connected to receive the said progress signal pulses, for deriving a position-lag signal dependent upon the difference between the number of command pulses and the number of progress signal pulses applied to its inputs;

headway distance computer means, connected to receive the said modified speed-demand signals for deriving a headway-distance signal representing a desirable headway distance corresponding to the speed represented by the said modified speed-demand signals;

comparison means, having a first input connected to receive the said position-lag signal and a second input connected to receive the said headway-distance signal, for providing a first predetermined voltage output when the headway distance represented by the said headway-distance signal is greater than the position-lag represented by the said position-lag signal, and providing a second predetermined voltage output when the headway distance represented by the said headway-distance signal is less than the position-lag represented by the said position-lag signal; and cumulative integrating means, connected to the said comparison means, for developing a modified speed-demand signal dependent upon a cumulative integration of the voltages developed on the output of the said comparison means, and limiting the said modified speed-demand signal to a predetermined range of values, in accordance with the said maximum acceleration and maximum deceleration limitations.

* * * * *